(12) United States Patent
Kim et al.

(10) Patent No.: US 11,140,382 B2
(45) Date of Patent: Oct. 5, 2021

(54) AV OUTPUT ANALYSIS DEVICE AND METHOD, AND COMPUTER-READABLE RECORDING MEDIUM

(71) Applicant: SAMSUNG ELECTRONICS CO., LTD., Suwon-si (KR)

(72) Inventors: Hyeong Ik Kim, Seoul (KR); Tae Young Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 16/765,075

(22) PCT Filed: Sep. 27, 2018

(86) PCT No.: PCT/KR2018/011455
§ 371 (c)(1),
(2) Date: May 18, 2020

(87) PCT Pub. No.: WO2019/098523
PCT Pub. Date: May 23, 2019

(65) Prior Publication Data
US 2020/0359009 A1 Nov. 12, 2020

(30) Foreign Application Priority Data

Nov. 16, 2017 (KR) .................. 10-2017-0152828

(51) Int. Cl.
*H04N 17/04* (2006.01)
*G06F 3/14* (2006.01)
(Continued)

(52) U.S. Cl.
CPC .......... *H04N 17/04* (2013.01); *G06F 3/1462* (2013.01); *H04N 5/38* (2013.01); *H04N 7/102* (2013.01);
(Continued)

(58) Field of Classification Search
CPC ..... G06F 3/1462; H04N 17/04; H04N 21/442
(Continued)

(56) References Cited

U.S. PATENT DOCUMENTS

2012/0005665 A1 1/2012 Repellin
2012/0017233 A1 1/2012 Kudelski et al.
(Continued)

FOREIGN PATENT DOCUMENTS

EP 1 624 669 A2 2/2006
EP 1 624 669 A3 2/2006
(Continued)

OTHER PUBLICATIONS

International Search Report (PCT/ISA/210) dated Jan. 25, 2019 issued by the International Searching Authority in International Application No. PCT/KR2018/011455.
(Continued)

*Primary Examiner* — Samira Monshi
(74) *Attorney, Agent, or Firm* — Sughrue Mion, PLLC

(57) ABSTRACT

Provided is an apparatus, method, and computer-readable recording medium for analyzing audio/video (AV) output, capable of automatically analyzing an AV output of a sink device. The apparatus for analyzing an AV output includes: a transmitter configured to transmit a high-definition multimedia interface (HDMI) signal generation command to a source device such that an AV screen is output on a sink device; a receiver configured to receive, from a user terminal, data of a mirroring screen corresponding to the AV screen being output on the sink device, and a controller configured to perform analysis by comparing the received data of the mirroring screen with reference data stored in a memory to analyze a responsiveness for a HDMI signal of a HDMI port provided in the sink device.

13 Claims, 12 Drawing Sheets

(51) Int. Cl.
  *H04N 5/38*      (2006.01)
  *H04N 7/10*      (2006.01)
  *H04N 21/4363*   (2011.01)
  *H04N 21/442*    (2011.01)

(52) U.S. Cl.
  CPC ..... *H04N 21/43635* (2013.01); *H04N 21/442* (2013.01)

(58) Field of Classification Search
  USPC .......................................... 348/184, 180, 189
  See application file for complete search history.

(56) References Cited

U.S. PATENT DOCUMENTS

| 2016/0249216 A1 | 8/2016 | Glazer et al. |
| 2017/0255304 A1* | 9/2017 | Lee .................... G06F 3/038 |

FOREIGN PATENT DOCUMENTS

| EP | 2 584 789 A2 | 4/2013 |
| EP | 2 584 789 A3 | 4/2013 |
| JP | 2016-116030 A | 6/2016 |
| KR | 10-2010-0137693 A | 12/2010 |
| KR | 10-2016-0031566 A | 3/2016 |

OTHER PUBLICATIONS

Communication dated Jul. 22, 2020 issued by the European Patent Office in European Application No. 18877869.0.

* cited by examiner

FIG. 12

| No | HDMI Input | Timing | Color space | Bit Depth | Picture |
|---|---|---|---|---|---|
| 0 | HDMI A | 720x400@70Hz<br>VIC31_1920x1080p@50Hz | RGB | 8 | |
| 1 | HDMI A | 640x480@67Hz<br>VIC3_720x480p@60Hz | RGB | 8 | |
| 2 | HDMI A | 800x600@60Hz<br>VIC19_1280x720p@50Hz | 4:4:4 | 10 | |
| 3 | HDMI B | 832x624@75Hz<br>VIC22_720x576i@50Hz | 4:4:4 | 12 | |
| 4 | HDMI B | 1024x768@70Hz<br>VIC5_1920x1080i@60Hz | 4:2:2 | 12 | |

Home
Setup Equipment
Setup for Testing
Test
Result

AV OUTPUT ANALYSIS DEVICE AND METHOD, AND COMPUTER-READABLE RECORDING MEDIUM

TECHNICAL FIELD

The disclosure relates to an apparatus, method, and computer-readable recording medium for analyzing an audio/video (AV) output, capable of automatically analyzing an AV output of a sink device.

BACKGROUND ART

Currently, people all over the world use various display products in everyday life. At home, televisions (TVs), monitors, and the like are used, and in the exhibition hall or outdoors, large format display (LFD) products are used for advertisement or promotion. Such display products are interfaced with source devices of various audio/video (AV) product groups to output timing and patterns corresponding to video electronics standards association (VESA) and consumer electronics association (CEA) standards. In this case, the interface compatibility of a sink device and a source device may cause a number of issues, such as video output noise or audio output insensitivity.

Conventionally, with regard to the issues caused by interface compatibility between a sink device and a source device, the cause of the issues has been analyzed through manual operation and visual inspection of a human, or a noise capture screen for an output of a sink device has been analyzed through a camera.

DISCLOSURE

Technical Problem

Therefore, it is an object of the disclosure to provide an apparatus, method, and computer-readable medium for analyzing AV output, in which an audio/video (AV) output generated from a sink device, such as a display product group is automatically analyzed by combining screen mirroring technology, which is a wireless connection environment between a sink device and a user terminal, with software technology employing an image comparison algorithm, so that a sink device-to-source device compatibility related drawback is detected.

Technical Solution

According to an aspect of the disclosure, there is provided an apparatus for analyzing an audio/video (AV) output, the apparatus including: a transmitter configured to transmit a high-definition multimedia interface (HDMI) signal generation command to a source device such that an AV screen is output on a sink device; a receiver configured to receive, from a user terminal, data of a mirroring screen corresponding to the AV screen being output on the sink device; and a controller configured to perform analysis by comparing the received data of the mirroring screen with reference data stored in a memory to analyze a responsiveness for a HDMI signal of a HDMI port provided in the sink device.

The controller may analyze the responsiveness for the HDMI signal of each of a plurality of the HDMI ports provided in the sink device.

The controller may compare the received data of the mirroring screen with the reference data, and when a difference between the received data of the mirroring screen and the reference data is greater than or equal to a preset reference range, may determine that the responsiveness for the HDMI signal of the HDMI port to be low.

The controller may compare the received data of the mirroring screen with the reference data, and when a difference between the received data of the mirroring screen and the reference data is greater than or equal to the preset reference range, may determine that noise has occurs in the data of the mirroring screen and determine the responsiveness for the HDMI signal of the HDMI port to be low.

The controller, upon determining that the responsiveness for the HDMI signal of the HDMI port is low, may determine at least one of circuitry or software related to the HDMI port to be abnormal.

The apparatus may further include an inputter configured to receive a setting value and a control command for AV output analysis of the sink device from a user.

The apparatus may further include a display on which a screen related to AV output analysis of the sink device.

The apparatus may further include a memory configured to store the reference data for AV output analysis of the sink device.

The sink device may be provided with a plurality of the HDMI ports, wherein the controller may control the transmitter to transmit an activation command for the plurality of HDMI ports to the sink device.

According to another aspect of the disclosure, there is provided a method of analyzing an audio/video (AV) output, the method including: transmitting a high-definition multimedia interface (HDMI) signal generation command to a source device such that an AV screen is output on a sink device; receiving, from a user terminal, data of a mirroring screen corresponding to the AV screen being output on the sink device; and performing analysis by comparing the received data of the mirroring screen with reference data stored in a memory to analyze a responsiveness for a HDMI signal of a HDMI port provided in the sink device.

The analyzing of the responsiveness for the HDMI signal of the HDMI port provided in the sink device may include: comparing the received data of the mirroring screen with the reference data; and when a difference between the received data of the mirroring screen and the reference data is greater than or equal to a preset reference range, determining that the responsiveness for the HDMI signal of the HDMI port to be low.

The analyzing of the responsiveness for the HDMI signal of the HDMI port provided in the sink device may include: comparing the received data of the mirroring screen with the reference data; and when a difference between the received data of the mirroring screen and the reference data is greater than or equal to the preset reference range, determining that noise has occurs in the data of the mirroring screen and determining the responsiveness for the HDMI signal of the HDMI port to be low.

The analyzing of the responsiveness for the HDMI signal of the HDMI port provided in the sink device may include: upon determining that the responsiveness of the HDMI signal of the HDMI port is low, determining at least one of circuitry or software related to the HDMI port to be abnormal.

The method may further include receiving a setting value and a control command for AV output analysis of the sink device from a user.

The method may further include displaying a screen related to AV output analysis of the sink device.

The sink device may be provided with a plurality of the HDMI ports, the method further including transmitting an activation command for the plurality of HDMI ports to the sink device.

According to another aspect of the disclosure, there is provided a computer readable recording medium including a program for executing a method of automatically analyzing an AV output of a sink device, the method including: transmitting a high-definition multimedia interface (HDMI) signal generation command to a source device such that an AV screen is output on a sink device; receiving, from a user terminal, data of a mirroring screen corresponding to the AV screen being output the sink device; and performing analysis by comparing the received data of the mirroring screen with reference data stored in a memory to analyze a responsiveness for a HDMI signal of a HDMI port provided in the sink device.

Advantageous Effects

As is apparent from the above, the apparatus, method, and computer-readable medium for analyzing an AV output according to one aspect can provide the following effects.

First, the inconvenience caused in the process of photographing a screen of a sink device using a camera to analyze an AV output is eliminated. As an example, combination of screen mirroring technology allows AV output analysis to be performed regardless of external noise effects, such as sunlight and ambient light, thereby providing the user with convenience in analysis.

In addition, a user terminal receives video signals and audio signals from a sink device through a wireless environment, such as Wi-Fi, and uses the received video signals and audio signals for AV output analysis, so that audio related drawbacks can be analyzed together with video related drawbacks

DESCRIPTION OF DRAWINGS

FIG. 12 is a diagram illustrating an example of an AV output analysis result screen.

MODES OF THE DISCLOSURE

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, As used herein, the singular forms "a," "an" and "the" are intended to include the plural forms as well, unless the context clearly indicates otherwise.

The disclosure relates to an apparatus, method, and computer readable recording medium for analyzing an AV output.

In more detail, the disclosure relates to an apparatus, method, and computer-readable medium for analyzing AV output, in which an audio/video (AV) output generated from a sink device, such as a display product group, is automatically analyzed by combining screen mirroring technology, which is a wireless connection environment between a sink device and a user terminal, with software technology employing an image comparison algorithm, to thereby detect a compatibility drawback between a sink device and a source device.

Hereinafter, the apparatus, method, and computer readable recording medium for analyzing an AV output will be described with reference to the accompanying drawings.

Figure 1:
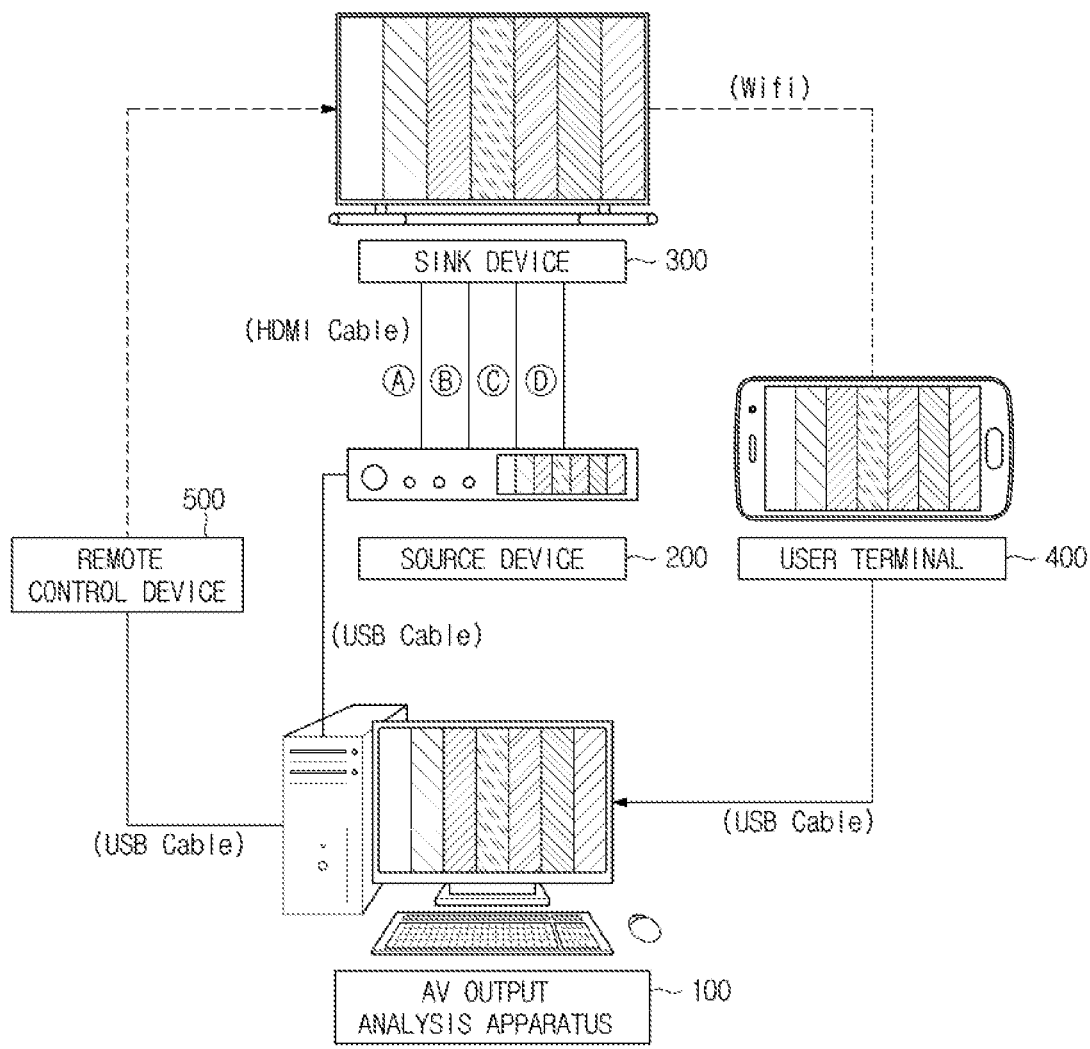
FIG. 1 is a conceptual diagram illustrating a system for analyzing an AV output according to an embodiment.

FIG. 1 is a conceptual diagram illustrating a system 10 for analyzing an AV output according to an embodiment.

Referring to FIG. 1, the system 10 for analyzing an AV output according to an embodiment includes an apparatus 100 for analyzing an AV output, a source device 200, a sink device 300, and a user terminal 400. According to an embodiment, the system 10 for analyzing an AV output may further include a remote control device 500.

The apparatus 100 for analyzing an AV output is an apparatus for controlling a signal flow between the system 10 for analyzing an AV output and components of the system 10 for analyzing an AV output, and may be provided using a computing device, such as a computer or a laptop computer.

The apparatus 100 for analyzing an AV output is configured to receive a setting value and a control command for analyzing an AV output of the sink device 300 from a user, and to provide a screen related thereto.

The apparatus 100 for analyzing an AV output, upon receiving a control command to analyze the AV output of the sink device 300 from the user, transmits high-definition multimedia interface (HDMI) signal generation command to the source device 200. When the HDMI signal generation command is transmitted to the source device 200, the source device 200 generates an HDMI signal including an audio signal and a video signal, and transmits the generated HDMI signal to the sink device 300 through an HDMI cable.

In the disclosure, the source device 200 may conceptually include an HDMI signal generator in which data for generating an HDMI signal is stored. The following embodiment of the disclosure may assume that the source device 200 is provided as an HDMI signal generator.

The HDMI signal generator is a device provided to simultaneously interface a digital video signal and a digital audio signal with a single cable. The HDMI signal generator may include a memory configured to store content data including video signals and audio signals therein, and may include a receiver for receiving content from an external content source according to embodiments.

The HDMI signal generator may decode the content data into a video signal and an audio signal based on the HDMI signal generation command received from the apparatus 100 for analyzing an AV output.

For example, the content data may be compressed by various video compression standards, such as Moving Picture Experts Group (MPEG), High Efficiency Video Coding (HEVC), and the like, and the HDMI signal generator may restore image frame data each representing an image frame from the compressed content data. Here, the image frame data is provided to analyze an AV output, and may be provided in a simplified form to analyze an AV output of the sink device 300 later. Details thereof will be described below in the relevant part.

The HDMI signal generator may transmit the restored HDMI signal to the sink device 300. In more detail, the HDMI signal generator may transmit the HDMI signal to the sink device 300 through an HDMI cable connecting the HDMI signal generator to the sink device 300.

Meanwhile, the sink device 300 is provided with a plurality of HDMI ports, and each of the HDMI ports is connected to the HDMI signal generator by an independent HDMI cable. The HDMI signal generator transmits an HDMI signal to the sink device 300 through an HDMI cable connected to an activated HDMI port among the plurality of HDMI ports provided in the sink device 300. The plurality of HDMI ports may be sequentially activated by a port activation command transmitted from the apparatus 100 for analyzing an AV output, which will be described in detail in the relevant part below.

The sink device 300 is a device provided for display, and when receiving an HDMI signal from the HDMI signal generator, outputs an audio/video (AV) screen corresponding to a preset standard based on the received HDMI signal. Types of the sink device 300 include a television (TV), a monitor, and a large format display (LFD), and other sink product groups, and the example of the sink product groups is not limited to thereto.

The sink device 300 receives an HDMI signal through an interface of one of the plurality of HDMI ports provided in the sink device 300, and noise may occur in the video output or an abnormality may occur in the audio output when the HDMI port has a weak responsiveness to the HDMI signal. The disclosure is provided to automatically analyze such drawbacks, and to this end, employ screen mirroring technology, which is a wireless connection environment of the sink device 300 and the user terminal 400.

The user terminal 400 receives data of a mirroring screen corresponding to an AV screen being output on the sink device 300, and at a request from the apparatus 100 for analyzing an AV output, transmit the data of the mirroring screen to the apparatus 100 for analyzing an AV output. At the request from the apparatus 100 for analyzing an AV output, the user terminal 400 may record a mirroring screen for a preset time to generate a video file, and transmit the generated video file to the apparatus 100 for analyzing an AV output. According to an embodiment, when the apparatus 100 for analyzing an AV output analyzes an output of the audio signal as well, the user terminal 400 generates an audio file corresponding to the video file recorded according to the request of the apparatus 100 for analyzing an AV output and transmit the generated audio file to the apparatus 100 for analyzing an AV output.

The apparatus 100 for analyzing an AV output may analyze the responsiveness for the HDMI signal of the HDMI port provided in the sink device 300 by performing analysis of comparing the data of the mirroring screen received from the user terminal 400 with reference data stored in the memory. In more detail, the apparatus 100 for analyzing an AV output compares the data of the mirroring screen with the reference data through combination of software technology employing an image comparison algorithm, and when a difference between the data of the mirroring screen and the reference data is equal to or larger than a preset range, determines that the HDMI port has a low responsiveness to the HDMI signal.

The disclosure uses screen mirroring technology, which is a wireless connection environment between the sink device 300 and the user terminal 400, so that AV outputs of display devices at home or outdoors are simply measured and analyzed without spatial limitation, thereby eliminating errors related to size deviation that is involved with accessibility to the space and installation environment of the display device. In addition, the disclosure allows a real-time screen mirroring output through wireless environments to be used for the AV output analysis process, so that accurate measurement analysis is performed without being affected by surrounding environments, such as ambient light or sunlight, and the audio output and the video output are simultaneously subject to detection and analysis for the drawback.

Hereinafter, the configuration of the apparatus 100 for analyzing an AV output will be described in more detail to aid in the understanding of the disclosure.

Figure 2:
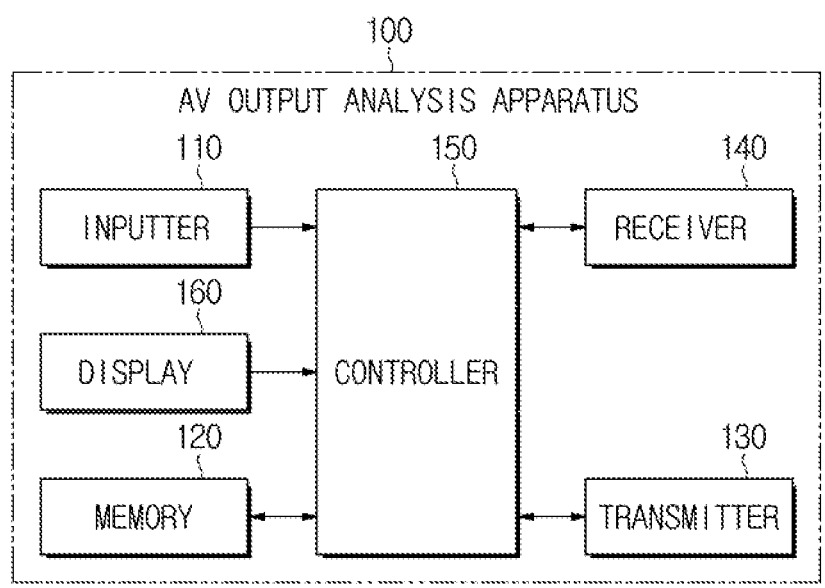
FIG. 2 is a control block diagram illustrating an apparatus for analyzing an AV output.

FIG. 2 is a control block diagram illustrating the apparatus 100 for analyzing an AV output. Referring to FIG. 2, the apparatus 100 for analyzing an AV output according to the embodiment includes an inputter 110, a memory 120, a transmitter 130, a receiver 140, a controller 150, and a display 160.

The inputter 110 is provided to receive a user input from a user and output an electrical signal corresponding to the user input to the controller 150. In detail, the inputter 110 is provided to receive a setting command and a control command for analyzing the AV output of the sink device 300 from the user and output an electrical signal corresponding to the setting command and the control command.

The inputter 110 may be provided by various input devices. For example, the inputter 110 may be provided in the form of a manipulation button, a pressing switch, or a touch pad for inputting a predetermined command. However, the implementation of the inputter 110 is not limited thereto, and the inputter 110 may be provided in the form of a touch screen panel (TSP) integrally provided with the display 160 or other various configurations capable of receiving a user input.

The memory 120 may store control programs and data for controlling the operation of the apparatus 100 for analyzing an AV output, and temporarily store data generated while the operation of the apparatus 100 for analyzing an AV output is being controlled.

The memory 120 may store reference data for AV output analysis of the sink device 300. The reference data for AV output analysis may be data serving as a criterion for determining noise of an AV output, and conceptually include reference image data based on which noise of a video output is determined and reference waveform data based on which noise of an audio output is determined.

The memory 120 may store a control program for transmitting an HDMI signal generation command to the source device 200, a control program for performing analysis by comparing mirroring screen data received from the user terminal 400 with the reference data stored in the memory 120 to analyze a responsiveness for the HDMI signal of the HDMI port provided in the sink device 300, and a control program for outputting a port activation command for the HDMI port provided in the sink device 300.

The memory 120 may include a non-volatile memory such as a Read Only Memory (ROM), a flash memory, an Erasable Programmable Read Only Memory (EPROM), an Electrically Erasable Programmable Read Only Memory (EEPROM) and the like, for long-term storage of data and a volatile memory, such as a static random access memory (S-RAM) a dynamic random access memory (D-RAM), and the like, for temporary storage of data.

The transmitter 130 may transmit an HDMI signal generation command to the source device 200 so that an AV screen is output on the sink device 300 under the control of the controller 150. The HDMI signal generation command may include variable value data set by a user for AV output analysis of the sink device 300. For example, when a resolution-related variable value and an audio-related variable value to be analyzed are input from a user, the transmitter 130 transmits a HDMI signal generation command to the source device 200 under the controller 150 such that the source device 200 generates an HDMI signal to which the variable values are applied.

The transmitter 130 may transmit an HDMI port switching command to the sink device 300 under the control of the controller 150. According to an embodiment, the transmitter 130 transmits an HDMI port switching command to the remote control device 500 connected to the apparatus 100 for analyzing an AV output under the control of the controller 150, so that the HDMI port switching command is transmitted to the sink device 300 through the remote control device 500.

The transmitter 130 may transmit, to the user terminal 400, a control command to record the mirroring screen for a certain time under the control of the controller 150. The user terminal 400 may generate a video file by recording data of the mirroring screen for a predetermined time according to the control command received from the transmitter 130. The process of generating the video file may be performed according to a program or application stored in advance in the user terminal 400, and the video file is provided in a process of an AV output of the sink device 300 being analyzed by the controller 150 of the apparatus 100 for analyzing an AV output.

The receiver 140 is provided to receive data of the mirroring screen corresponding to the AV screen output on the sink device 300 from the user terminal 400. The receiver 140 receives a video file obtained by recording the mirroring screen for a predetermined time from the user terminal 400 under the control of the controller 150, and provides the received video file for the AV output analysis process of the controller 150.

The controller 150 controls the overall operation of the apparatus 100 for analyzing an AV output and the signal flow between internal components of the apparatus 100 for analyzing an AV output, and processes data.

The controller 150 may execute a control program or application stored in the memory 120 of the apparatus 100 for analyzing an AV output when a control command is input from a user or a predetermined condition is satisfied.

In detail, when a setting command for analyzing the AV output of the sink device 300 is input from the user through the inputter 110 of the apparatus 100 for analyzing an AV output, the controller 150 executes the control program stored in the memory 120 of the apparatus 100 for analyzing an AV output to receive a variable value for AV output analysis. Subsequently, when an operation command for analyzing the AV output is input from the user, the controller 150 may transmit a HDMI signal generation command to the source device 200 such that an AV screen is output on the sink device 300 based on the inputted variable value for analyzing the AV output.

In addition, the controller 150, upon receiving data of the mirroring screen corresponding to the AV screen output on the sink device 300 from the user terminal 400, may execute a control program for analyzing a responsiveness a HDMI signal of a HDMI port provided in the sink device 300 by performing analysis of comparing the received data of the mirroring screen with the reference data stored in the memory 120.

The controller 150 compares the data of the mirroring screen with the reference data, and when the difference between the data of the mirroring screen and the reference data is greater than or equal to a preset reference range, the controller 150 may determine that the HDMI port has a low responsiveness to the HDMI signal. For example, the controller 150 compares image data of the mirroring screen with the reference data, and when the comparing reveals that a certain pixel value among a plurality of pixel values has a difference in a reference range or greater, determines that noise has occurred in the corresponding pixel, and the responsiveness for the HDMI signal of the HDMI port is low. In addition, the controller 150 compares audio data of the mirroring screen with the reference data, and when the comparing reveals that the audio data is different from the reference data in a reference range or greater, determines that noise has occurred, and the responsiveness for the HDMI signal of the HDMI port is low. Details thereof will be described in detail in the relevant section below.

The control program may analyze a responsiveness for the HMDI signal of each of the plurality of HDMI ports provided in the sink device 300. For example, the control program may analyze the responsiveness for the HDMI signal of the plurality of HDMI ports from HDMI port A through HDMI port B, . . . to HDMI port n.

In order to analyze an HDMI signal for each of the plurality of HDMI ports provided in the sink device 300, the respective HDMI ports need to be sequentially activated. Accordingly, the controller 150 may control the transmitter 130 to sequentially transmit an HDMI port activation command for the respective HDMI ports. The HDMI port activation command output through the transmitter 130 may be directly transmitted to the sink device 300, and according to an embodiment, may be transmitted to the sink device 300 through a remote control device of the sink device 300. Here, the remote control device of the sink device 300 is a device separately provided to transmit a control command remotely to the sink device 300, and may conceptually include devices that may transmit a control command remotely, such as the user terminal 400 or a remote controller of a display device.

The controller 150, upon determining that the HDMI port has a low responsiveness to the HDMI signal, may determine that an abnormality has occurred in at least one of circuitry and software related to the corresponding HMDI port. For example, when it is determined that the responsiveness for the HDMI signal of HDMI port A is low, the controller 150 may determine that an abnormality has occurred in at least one of circuitry and software related to the HDMI port A, and when it is determined that the responsiveness for the HDMI signal of one of HDMI port B, . . . and n is low, determine that an abnormality has occurred in at least one of circuitry and software related to the corresponding HDMI port.

The controller 150 may control the display 160 to display a screen related to AV output analysis of the sink device 300.

The display 160 may display an image corresponding to a user input or display an image related to AV output analysis based on the control of the controller 150.

The display 160 may include a display panel for visually displaying an image and a display driver for driving the display panel. The display panel may generate an image according to image data received from the display driver and display the image.

The display 160 may display a setting screen for setting a variable value for analyzing the AV output of the sink device 300 according to a user's input, and when an operation for analyzing the AV output is started, may display a progress screen displaying the AV output analysis process, and when the AV output analysis is completed, display an AV output analysis result screen that provides an AV output analysis result. Examples of screen configuration will be described in detail in the relevant part.

The display 160 may be implemented as a liquid crystal panel, and may be embodied as a light emitting diode (LED) panel and an organic light emitting diode (OLED) panel capable of self-emission according to an embodiment.

In the above, the configuration of the system 10 for analyzing an AV output according to the embodiment and the apparatus 100 for analyzing an AV output which is one of the components of the system 10 for analyzing an AV output have been described in detail.

Hereinafter, the method and the computer-readable recording medium for analyzing the AV output will be described in detail based on the contents described above.

The method for AV output analysis described below may be implemented as a program (or an application) including an executable algorithm that may be executed on a computer, and the program may be stored and provided in a recording medium, in more detail, in a non-transitory computer readable medium. For example, such a program may be implemented as an application and may be stored in a server, such as an app store. The application stored in the server may be downloaded by the user and the downloaded application may be installed in the apparatus 100 for analyzing an AV output.

The non-transitory readable medium refers to a device readable medium that stores data semi-permanently, not a medium storing data for a short time, such as a register, a cache, or a memory. In more detail, various applications or programs described above may be stored and provided in a non-transitory readable medium, such as a CD, DVD, hard disk, Blu-ray disk, USB, memory card, ROM, and the like.

Figure 3:
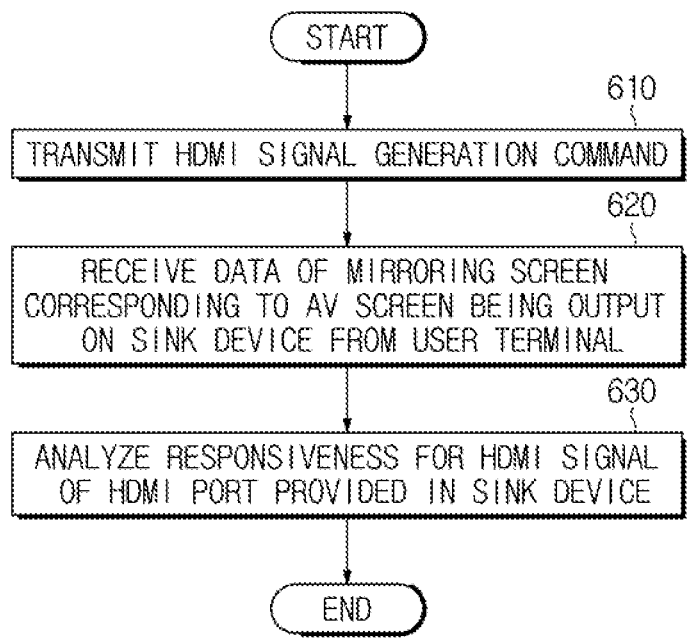
FIG. 3 is a flowchart showing a method of analyzing an AV output.
Figure 4:
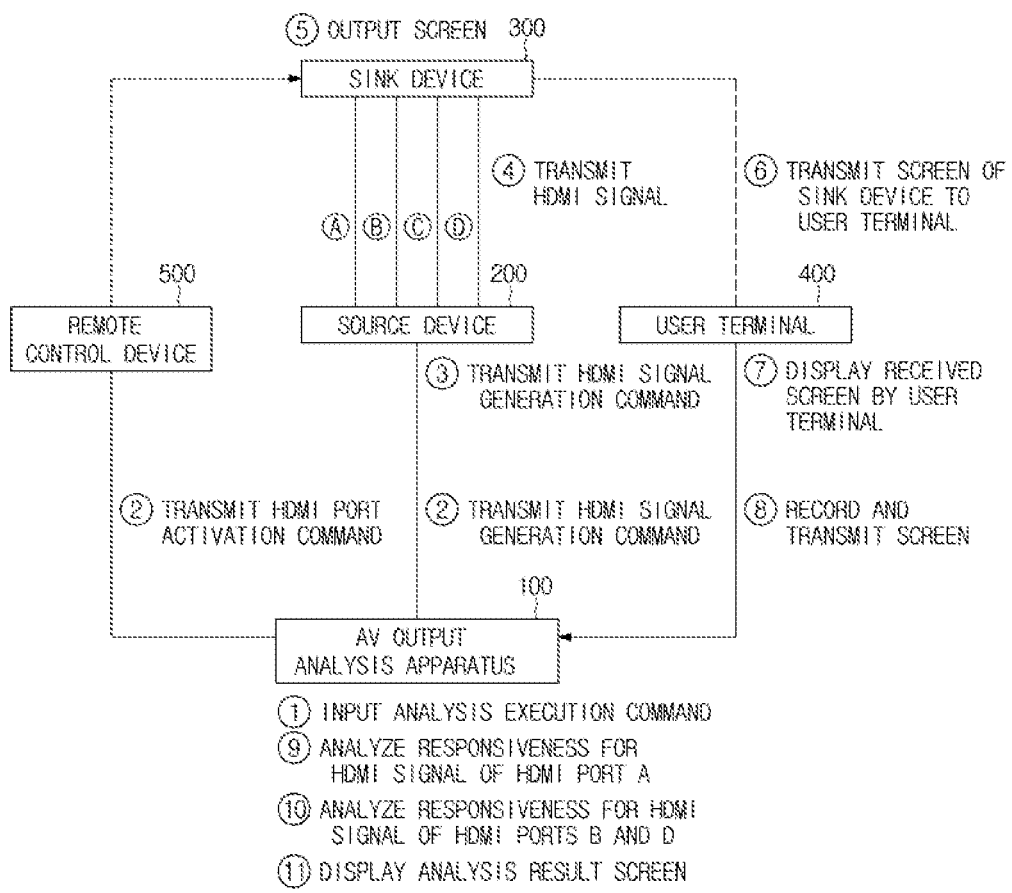
FIG. 4 is a conceptual diagram specifically illustrating a method of analyzing an AV output.

FIG. 3 is a flowchart showing a method of analyzing an AV output, and FIG. 4 is a conceptual diagram specifically illustrating the method of analyzing an AV output.

Referring to FIGS. 3 and 4, the method for AV output analysis according to the embodiment includes transmitting an HDMI signal generation command to the source device 200 so that an audio/video (AV) screen is output on the sink device 300 (610); receiving data of a mirroring screen corresponding to the AV screen output on the sink device 300 from the user terminal 400 (620), and analyzing responsiveness for a. HDMI signal of a HDMI port provided in the sink device 300 on the basis of the received data of the mirroring screen data (630).

First, before the transmitting of the HDMI signal generation command from the apparatus 100 for analyzing an AV output to the source device 200, the method includes receiving a resolution-related variable value and an audio-related variable value to be analyzed from the user through the inputter 110 of the apparatus 100 for analyzing an AV output. The variable values are input through a setting screen provided on the display 160 of the apparatus 100 for analyzing an AV output. Hereinafter, an example of the setting screen for analyzing an AV output will be described below to aid in the understanding of the disclosure.

Figure 5:
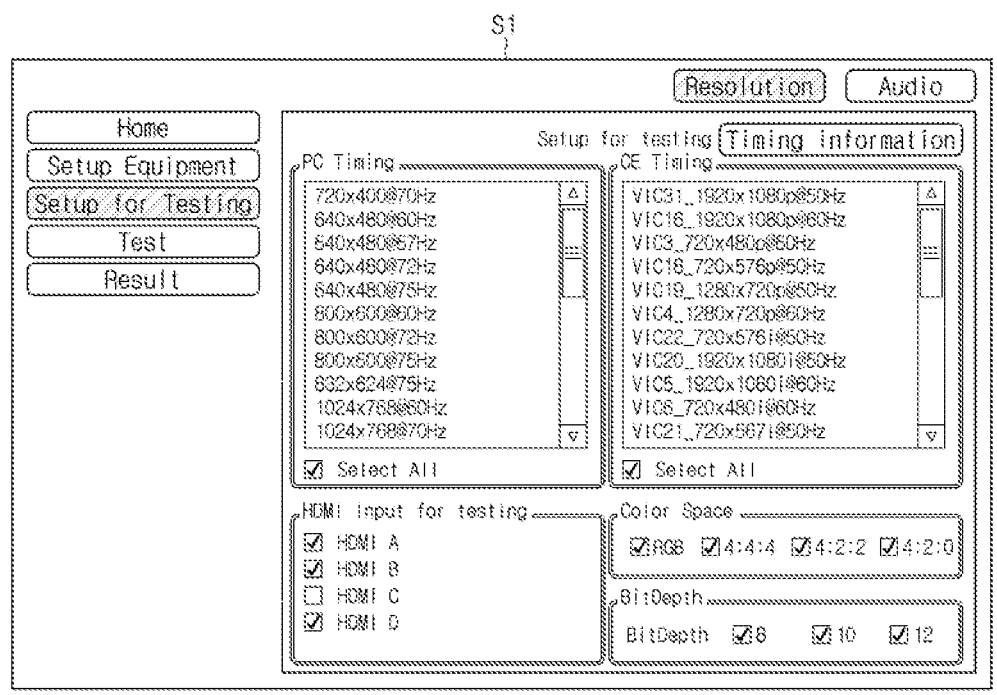
FIGS. 5 and 6 are diagrams illustrating examples of a setting screen for AV output analysis.
Figure 6:
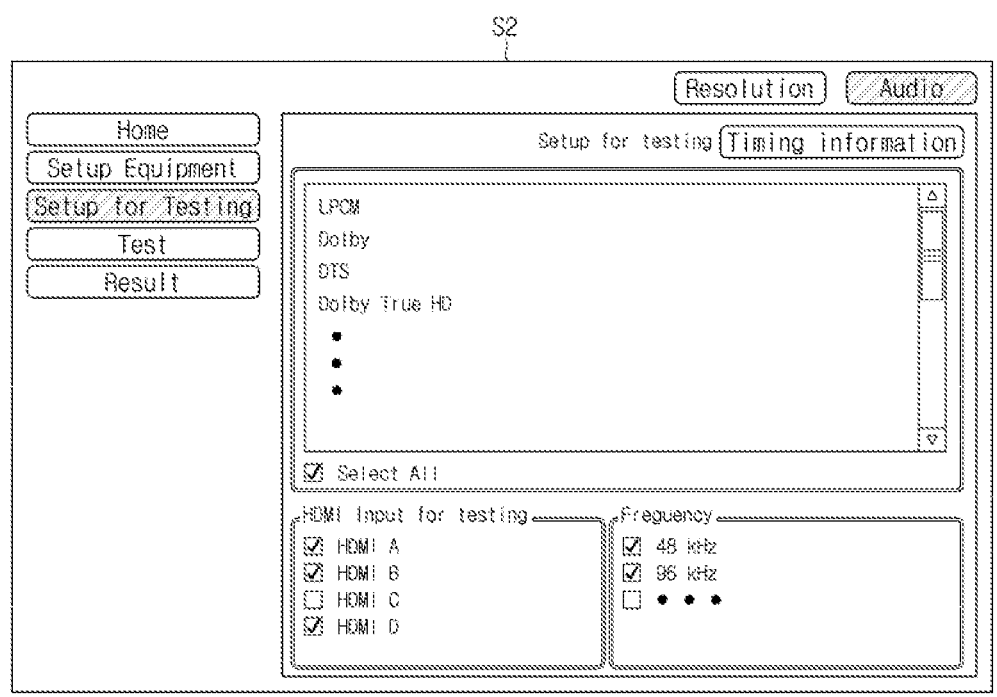

FIGS. 5 and 6 are diagrams illustrating examples of a setting screen for AV output analysis. In detail, FIG. 5 shows an example of a resolution setting screen for receiving a resolution related variable value, and FIG. 6 shows an example of an audio setting screen for receiving an audio related variable value.

Referring to FIG. 5, a resolution setting screen S1 is provided on a left area thereof with a button 'Home' to enter a home screen of an AV output analysis program, a button 'Setup Equipment' to enter a screen for confirming connection of components of the system 10 for analyzing an AV output, a button 'Setup for Testing' to enter a setting screen, a button 'Test' to enter an analysis screen, and a button 'Result' to enter an analysis result screen. FIG. 5 illustrates an example of the resolution setting screen, and the button 'Setup for Testing' may be provided with a separate identification mark to indicate that the current screen is the resolution setting screen.

The resolution setting screen S2 is provided on an upper area thereof with buttons for selecting a setting object. In detail, the buttons include a button 'Re-solution' to enter the resolution setting screen and a button 'Audio' to enter the audio setting screen. FIG. 5 illustrates an example of the resolution setting screen, and the button 'Resolution' may be provided with a separate identification mark to indicate that the current screen is the resolution setting screen.

The resolution setting screen S3 has a main area divided into areas for setting variable values related to the resolution. For example, an area for settling PC Timing-related items, an area for setting CE Timing-related items, an area for setting an HDMI port of the sink device 300 to be analyzed, an area for selecting a color space, and an area for setting a bit depth.

The user may set the resolution-related variable value by selecting or deselecting a check box provided in each area.

Referring to FIG. 6, an audio setting screen S2 has left and right areas thereof similar to those described in FIG. 5. However, FIG. 6 shows an example of the audio setting screen S2, and the button 'Audio' may be provided with a separate identification mark to indicate that the current screen is the audio setting screen.

The audio setting screen S2 has a main area divided into areas for setting variable values related to audio. For example, the main area may be divided into an area for setting an audio format, an area for setting an HDMI port of the sink device 300 to be analyzed, and an area for setting a frequency.

FIGS. 5 and 6 show an example of a setting screen provided on the screen of the apparatus 100 for analyzing an AV output, and the construction method of the setting screen is not limited thereto. Hereinafter, for the sake of convenience in description, an AV output method will be described in relation that HDMI ports A. B, and D of HDMI ports A, B, C, and D are selected as an example.

When a resolution-related variable value and an audio-related variable value are input based on the setting screens S1 and S2, an analysis execution command may be input from a user. On the setting screens S1 and S2, a button 'Run' for performing analysis may be provided, and according to an embodiment, the button 'Run' may be provided on an analysis screen provided through the button 'Test'.

The inputting of the analysis execution command to the apparatus 100 for analyzing an AV output from a user is followed by a process of transmitting a HDMI signal generation command from the transmitter 130 of the apparatus 100 for analyzing an AV output to the source device 200 such that the source device 200 generates an HDMI signal to which the corresponding variable values are applied.

Meanwhile, the transmitter 130 of the apparatus 100 for analyzing an AV output, while transmitting the HDMI signal generation command to the source device 200, transmits a HDMI port activation command to the sink device 300 to activate an HDMI port to be analyzed among the HDMI ports provided in the sink device 300.

The HDMI port activation command may be transmitted to the sink device 300 through the remote control device 500 connected to the apparatus 100 for analyzing an AV output according to an embodiment. For example, when an AV output analysis command for HDMI port A is input from the user, the transmitter 130 may transmit an activation command for HDMI port A to the sink device 300 through the remote control device 500 connected to the apparatus 100 for analyzing an AV output.

The source device 200, upon receiving the HDMI signal generation command, may generate an HDMI signal based on the received HDMI signal generation command and transmit the generated HDMI signal to the sink device 300 through an HDMI cable. The HDMI signal is transmitted to the sink device 300 through an activated HDMI port among a plurality of HDMI ports provided in the sink device 300, and since HDMI port A of the sink device 300 is activated first based on the HDMI port activation command as described above, the HDMI signal is transmitted to the sink device 300 through HDMI port A.

The sink device 300 provides an AV screen based on the HDMI signal received from the source device 200. In the process of providing the AV screen on the sink device 300, when the HDMI port provided in the sink device 300 has a weak responsiveness to the HDMI signal, noise may be generated in the AV screen provided through the sink device 300.

The disclosure is provided to analyze the noise of the AV screen to analyze the responsiveness for the HDMI signal of the HDMI port. To this end, the sink device 300 may provide the user terminal 400 with mirroring screen data corresponding to the AV screen of the sink device 300. The sink device 300 and the user terminal 400 are provided to communicate with each other through a wireless communication environment, such as Wi-Fi, and the sink device 300 may transmit data of a mirroring screen to the user terminal 400 through a wireless communication environment, such as Wi-Fi.

The user terminal 400 may provide a mirroring screen corresponding to the AV screen of the sink device 300 to the display 160 of the user terminal 400 based on the data of the mirroring screen received from the sink device 300. Subsequently, the user terminal 400 may generate a video file by recording the mirroring screen for a preset time at a request of the apparatus 100 for analyzing an AV output, and transmit the generated video file to the apparatus 100 for analyzing an AV output. The disclosure may be provided to analyze the AV output based on the video file, so that the video output is analyzed at the same time as analyzing the audio output according to the embodiment. Details thereof will be described in the relevant part below.

Subsequently, a process of receiving the data of the mirroring screen corresponding to the AV screen output on the sink device 300 from the user terminal 400, and analyzing the responsiveness for the HDMI signal of the HDMI port provided in the sink device 300 based on the received data of the mirroring screen is performed.

The process of analyzing the responsiveness for o the HDMI signal of the HDMI port provided in the sink device 300 includes analyzing a video output to analyze the responsiveness for the HDMI signal of the HDMI port, and according to an embodiment, includes analyzing an audio output to analyze the responsiveness for the HDMI signal of the HDMI port.

Hereinafter, in order to aid in the understanding of the disclosure, a process of analyzing a video output to analyze the responsiveness for the HDMI signal of the HDMI port and a process of analyzing an audio output to analyze the responsiveness for the HDMI signal of the HDMI port will be described.

Figure 7:
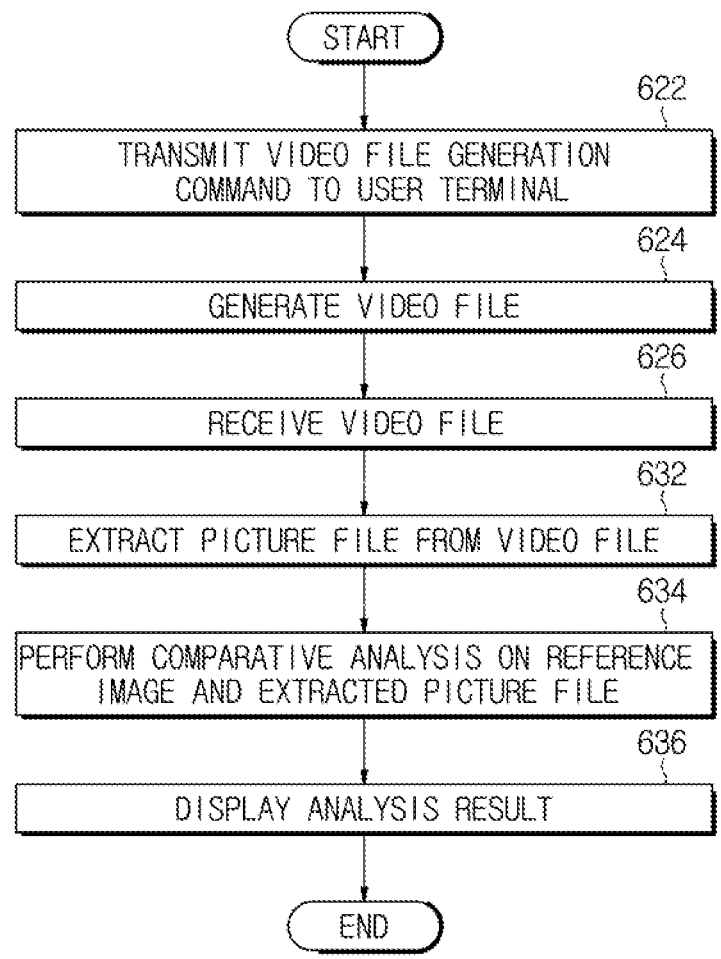
FIG. 7 is a flowchart illustrating a video output analysis process.
Figure 8:
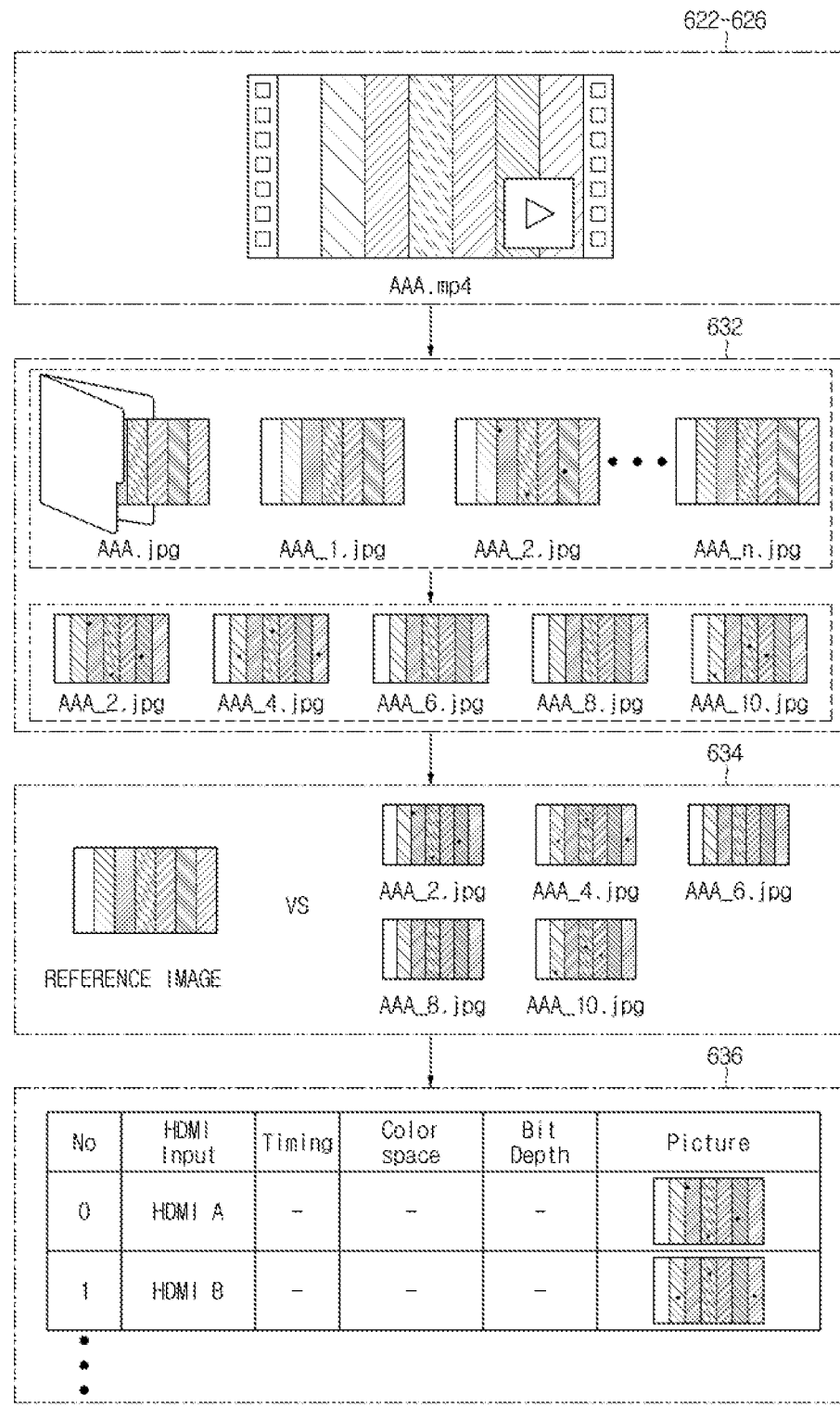
FIG. 8 is a flowchart specifically illustrating a video output analysis process.

FIG. 7 is a flowchart illustrating a video output analysis process, and FIG. 8 is a flowchart specifically illustrating a video output analysis process.

Referring to FIG. 7, the video output analysis process includes transmitting a video file generation command to the user terminal 400 by the apparatus 100 for analyzing an AV output (622), generating a video file by the user terminal 400 (624), receiving the video file by the apparatus 100 for analyzing an AV output (626), extracting a picture file based on the received video file by the apparatus 100 for analyzing an AV output (632), and performing analysis of comparing the extracted picture file with a reference image by the apparatus 100 for analyzing an AV output (634), and displaying the analysis result by the apparatus 100 for analyzing an AV output (636).

First, operation 622 of the apparatus 100 for analyzing an AV output transmitting a video file generation command to the user terminal 400 is performed. The apparatus 100 for analyzing an AV output may transmit the video file generation command to the user terminal 400 through a USB cable connecting the apparatus 100 for analyzing an AV output to the user terminal 400.

Operation 624 of the user terminal 400, upon receiving the video file generation command from the apparatus 100 for analyzing an AV output, generating a video file is performed. The user terminal 400 executes a video file generation program or application previously stored in the memory of the user terminal 400 at the request of the apparatus 100 for analyzing an AV output, and records a mirroring screen for a preset time to generate a video file.

Referring to FIG. 8, the user terminal 400 may generate an AAA.mp4 type video file at the request of the apparatus 100 for analyzing an AV output. However, the form of the video file is not limited to the example shown in FIG. 8, various types of video files, such as that of avi, mkv, asf, wmv, 3gp, vro, mpg, mpeg, ts, tp, trp, mov, flv, vob, svi, divx and the like, may be generated.

The user terminal 400 transmits the video file generated at the request of the apparatus 100 for analyzing an AV output to the apparatus 100 for analyzing an AV output, and the apparatus 100 for analyzing an AV output receives the video file from the user terminal 400 in operation 626.

Operation 632 of the apparatus 100 for analyzing an AV output, upon receiving the video file from the user terminal 400, extracting a picture file based on the received video file is performed. The controller 150 of the apparatus 100 for analyzing an AV output may extract part of a plurality of picture files constituting the video file at predetermined frame intervals or randomly.

Referring to FIG. 8, the apparatus 100 for analyzing an AV output may primarily extract a plurality of picture files (e.g., AAA_1.jpg, AAA_2.jpg, . . . and AAA_n.jpg, herein n is an integer greater than or equal to 3) constituting the video file based on the video file, and extract some of the picture files (e.g., AAA_2.jpg, AAA_4.jpg, AAA_6.jpg, AAA_8.jpg, and AAA_10.jpg) among the primarily extracted picture files at predetermined frame intervals or randomly. On the other hand, the form of the picture file is not limited to the example shown in FIG. 8, and various types of picture files, such as that of gif, png, psd, bmp, and tiff may be generated.

After the plurality of picture files are extracted based on the video file, operation 634 of the apparatus 100 for analyzing an AV output performing analysis by comparing the extracted plurality of picture files with reference image data stored in the memory 120 of the apparatus 100 for analyzing an AV output is performed. The controller 150 of the apparatus 100 for analyzing an AV output performs analysis by comparing the reference image data stored in the memory 120 of the apparatus 100 for analyzing an AV output with the extracted picture file based on a program or application employing an image analysis algorithm, to determine whether noise exists in the extracted picture file. The apparatus 100 for analyzing an AV output may determine that a responsiveness to a HDMI signal of a HDMI port is low when noise exists in a picture file or when noise exists in a preset number or more picture files.

Referring to FIG. 8, the apparatus 100 for analyzing an AV output may compare a reference image with each of the picture files of AAA_2.jpg, AAA_4.jpg, AAA_6.jpg, AAA_8.jpg and AAA_10.jpg by units of pixel data in horizontal and vertical directions, and when the comparing reveals a difference greater than or equal to a preset reference range, determine that noise exists in the corresponding picture file.

Figure 9:
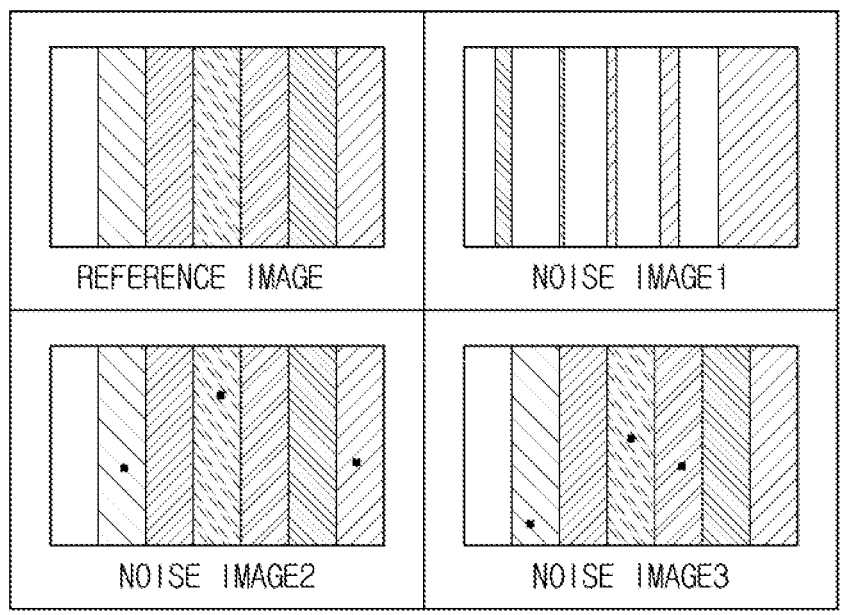
FIG. 9 is a diagram illustrating examples of a noise screen generated during video output analysis.

FIG. 9 is a diagram illustrating a reference screen and examples of a noise screen generated during video output analysis. Referring to FIG. 9, the noise screen may be displayed in the form of the reference screen broken or implemented in a single color. FIG. 9 merely shows examples of the noise screen, and the example of the noise screen is not limited to that illustrated in FIG. 9.

After the comparative analysis of the reference image data and the extracted picture file by the apparatus 100 for analyzing an AV output is completed, operation 636 displaying the result of the AV output analysis on the display 160 of the apparatus 100 for analyzing an AV output is performed.

The display 160 of the apparatus 100 for analyzing an AV output may display an AV output analysis result screen, and the AV output analysis result screen may provide items related to HDMI ports determined to have a low responsiveness to the HDMI signal, analysis variable values of the corresponding HDMI ports, and noise screen data (for example, the noise screen in FIG. 9) based on which the corresponding analysis result has been obtained.

Next, an audio output analysis process will be described.

When the audio output analysis process according to the disclosure includes the apparatus 100 for analyzing an AV output, upon receiving a video file according to the process of FIG. 7, extracting audio waveform data from the video file, and performing analysis by comparing the extracted audio waveform data with reference waveform data, and displaying the analysis result by the apparatus 100 for analyzing an AV output.

That is, the disclosure has a benefit of analyzing a video output by extracting a picture file from a video file while analyzing an audio output by extracting audio waveform data.

Figure 10:
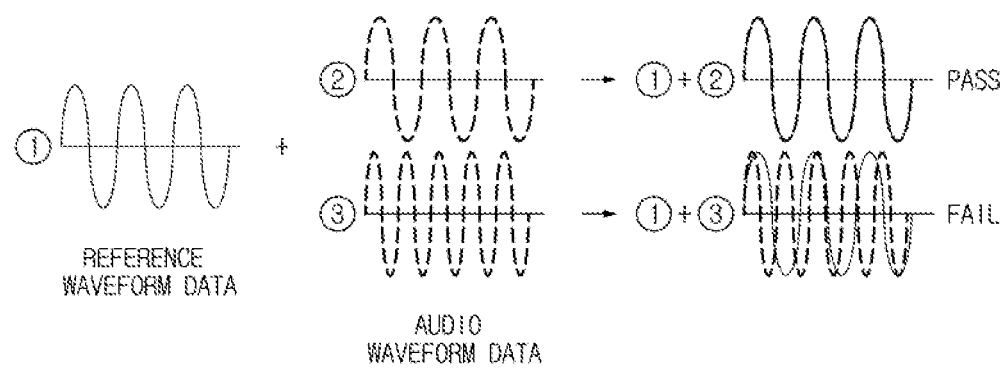
FIG. 10 is a diagram for describing the principle of audio output analysis.

FIG. 10 is a diagram for describing the principle of audio output analysis.

Referring to FIG. 10, the controller 150 of the apparatus 100 for analyzing an AV output performs analysis by comparing reference waveform data with extracted waveform data, and when a difference between the reference wave data and the extracted waveform data is greater than or equal to a reference range, determines that noise exists in the audio output. In detail, referring to FIG. 10, comparing reference waveform data 1 and audio waveform data 2 does not exhibit a difference greater than or equal to a reference range, and thus the controller 150 may determine that noise does not exist in the audio output, and comparing reference waveform data 1 and audio waveform data 3 exhibits a difference greater than or equal to the reference range, and thus the controller 150 may determine that noise exists in the audio output.

After operation of the apparatus 100 for analyzing an AV output performing analysis by comparing the reference waveform data with the extracted audio waveform data is completed, operation of displaying an AV output analysis result on the display 160 of the apparatus 100 for analyzing an AV output is performed. The display 160 of the apparatus 100 for analyzing an AV output may display an AV output analysis result screen, and the AV output analysis result screen may provide items related to HDMI ports determined to have a low responsiveness to the HDMI signal, analysis variable values of the corresponding HDMI ports, and noise waveform data based on which the corresponding analysis result has been obtained.

The controller 150 of the apparatus 100 for analyzing an AV output may analyze the video output and the audio output for the HDMI ports provided in the sink device 300 according to the above-described principle. As described above, when an analysis command for each of HDMI ports A, B, and D is input by a user, the apparatus 100 for analyzing an AV output may perform video output and audio output analysis on HDMI port A as many times as the number of cases for the variable values set to analyze the AV output. Subsequently, the video output and audio output for HDMI ports B and D provided in the sink device 300 may be analyzed in the same manner as the above.

Figure 11:
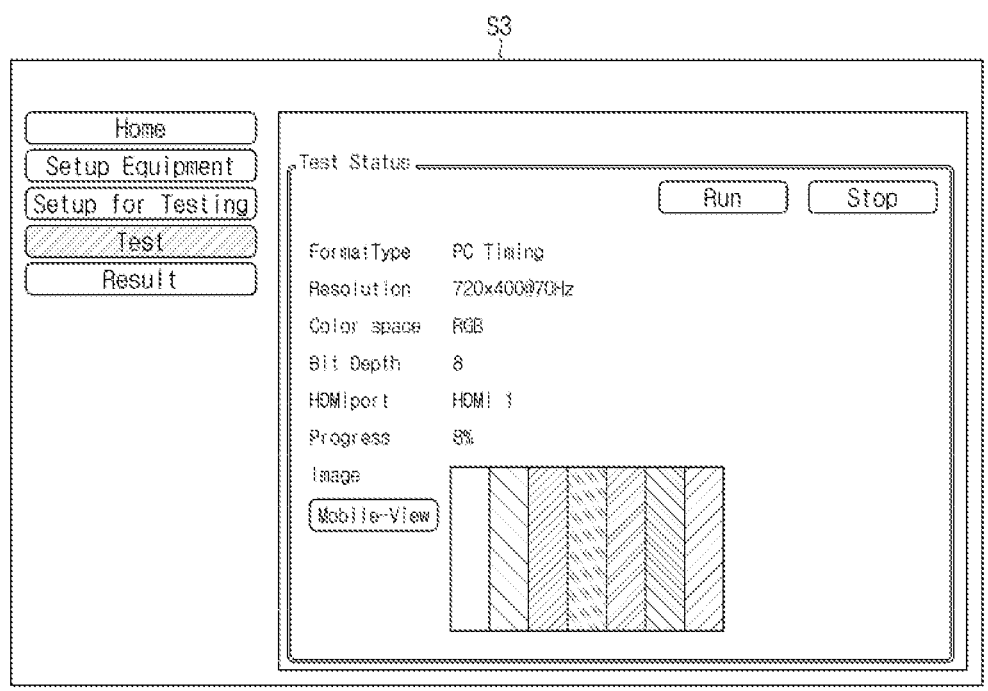
FIG. 11 is a diagram illustrating an example of a progress screen provided to an apparatus for analyzing AV output during AV output analysis.

During analysis of the AV output of the sink device 300 by the apparatus 100 for analyzing an AV output, a progress screen may be provided on the display 160 of the apparatus 100 for analyzing an AV output. The progress screen may provide a progress bar for visually providing an analysis progress while simultaneously providing variable values under analysis. FIG. 11 is a diagram illustrating an example of a progress screen S3 provided to the apparatus 100 for analyzing AV output during AV output analysis, but an example of providing the progress screen S3 is not limited thereto.

Subsequently, when analysis of the apparatus 100 for analyzing an AV output is completed, an AV output analysis result screen may be provided on the display 160 of the apparatus 100 for analyzing an AV output.

FIG. 12 is a diagram illustrating an example of an AV output analysis result screen S4.

Referring to FIG. 12, the AV output analysis result screen S4 may provide items related to HDMI ports determined to have a low responsiveness to the HDMI signal, analysis variable values of the corresponding HDMI ports, and noise screen data based on which the corresponding analysis result has been obtained. FIG. 12 merely illustrates an example of an AV output analysis result screen, and an example of providing an AV output analysis result screen is not limited thereto Although embodiments of the apparatus and method for analyzing AV output according to the present invention have been described for illustrative purposes, those skilled in the art will appreciate that various modifications, additions and substitutions are possible, without departing from the scope and spirit of the disclosure. Therefore, embodiments of the present invention have not been described for limiting purposes.

The invention claimed is:

1. An apparatus for analyzing an audio/video (AV) output, the apparatus comprising:
a transmitter configured to transmit a high-definition multimedia interface (HDMI) signal generation command to a source device such that an AV screen is output on a sink device;
a receiver configured to receive, from a user terminal, data of a mirroring screen corresponding to the AV screen being output on the sink device; and
a controller configured to,
perform analysis by comparing the received data of the mirroring screen with reference data stored in a memory to analyze a responsiveness for an HDMI signal of an HDMI port provided in the sink device, and
based on a difference between the received data of the mirroring screen and the reference data being greater than or equal to a preset reference range, determine that the responsiveness for the HDMI signal of the HDMI port is low.

2. The apparatus of claim 1, wherein the controller is further configured to analyze the responsiveness for the HDMI signal of each of a plurality of HDMI ports provided in the sink device.

3. The apparatus of claim 1, wherein the controller is further configured to, based on the difference between the received data of the mirroring screen and the reference data being greater than or equal to the preset reference range, determine that a noise has occurred in the data of the mirroring screen.

4. The apparatus of claim 1, wherein the controller is further configured to, based on determining that the responsiveness for the HDMI signal of the HDMI port is low, determine that at least one of circuitry or software related to the HDMI port is abnormal.

5. The apparatus of claim 1, further comprising the memory configured to store the reference data for AV output analysis of the sink device.

6. The apparatus of claim 1, wherein the sink device is provided with a plurality of HDMI ports,
wherein the controller is further configured to control the transmitter to transmit an activation command for the plurality of HDMI ports to the sink device.

7. The apparatus of claim 1, further comprising an inputter configured to receive a setting value and a control command for AV output analysis of the sink device from a user.

8. The apparatus of claim 7, further comprising a display configured to display a screen related to the AV output analysis of the sink device.

9. A method of analyzing an audio/video (AV) output, the method comprising:
transmitting a high-definition multimedia interface (HDMI) signal generation command to a source device such that an AV screen is output on a sink device;
receiving, from a user terminal, data of a mirroring screen corresponding to the AV screen being output on the sink device;
performing analysis by comparing the received data of the mirroring screen with reference data stored in a memory to analyze a responsiveness for an HDMI signal of an HDMI port provided in the sink device, and
based on a difference between the received data of the mirroring screen and the reference data being greater than or equal to a preset reference range, determining that the responsiveness for the HDMI signal of the HDMI port is low.

10. The method of claim 9, wherein the analyzing of the responsiveness for the HDMI signal of the HDMI port provided in the sink device comprises:
comparing the received data of the mirroring screen with the reference data; and
based on the difference between the received data of the mirroring screen and the reference data being greater than or equal to the preset reference range, determining that a noise has occurred in the data of the mirroring screen.

11. The method of claim 9, wherein the analyzing of the responsiveness for the HDMI signal of the HDMI port provided in the sink device comprises, based on determining that the responsiveness of the HDMI signal of the HDMI port is low, determining that at least one of circuitry or software related to the HDMI port is abnormal.

12. The method of claim 9, further comprising:
receiving a setting value and a control command for AV output analysis of the sink device from a user, and
displaying a screen related to the AV output analysis of the sink device,
wherein the sink device is provided with a plurality of HDMI ports, and
wherein the method further comprises transmitting an activation command for the plurality of HDMI ports to the sink device.

13. A non-transitory computer readable recording medium including a program for executing a method of automatically analyzing an AV output of a sink device, the method comprising:
transmitting a high-definition multimedia interface (HDMI) signal generation command to a source device such that an AV screen is output on the sink device;
receiving, from a user terminal, data of a mirroring screen corresponding to the AV screen being output on the sink device;
performing analysis by comparing the received data of the mirroring screen with reference data stored in a memory to analyze a responsiveness for an HDMI signal of an HDMI port provided in the sink device; and
based on a difference between the received data of the mirroring screen and the reference data being greater than or equal to a preset reference range, determining that the responsiveness for the HDMI signal of the HDMI port is low.

\* \* \* \* \*